Feb. 2, 1954  H. SCHNEIDER  2,668,274
VOLTAGE TRANSFORMER FOR HIGH-TENSION MAINS
Filed March 9, 1951  2 Sheets-Sheet 1

INVENTOR.
Hans Schneider,
BY
Benjamin Tomas.
Atty.

Feb. 2, 1954     H. SCHNEIDER     2,668,274
VOLTAGE TRANSFORMER FOR HIGH-TENSION MAINS
Filed March 9, 1951     2 Sheets-Sheet 2

INVENTOR.
Hans Schneider,
BY

Patented Feb. 2, 1954

2,668,274

UNITED STATES PATENT OFFICE 2,668,274

VOLTAGE TRANSFORMER FOR HIGH-TENSION MAINS

Hans Schneider, Zurich, Switzerland, assignor to Ateliers de Construction Oerlikon, Zurich-Oerlikon, Switzerland, a corporation of Switzerland Application March 9, 1951, Serial No. 214,768

Claims priority, application Switzerland March 28, 1950

7 Claims. (Cl. 323—61)

In mains with high voltage and grounded zero the voltage transformer is frequently set in an oil container (insulating shell made for example of refined garnierite) in order to economize the comparatively expensive leading-in.

In searching for dimensions and weights that are as small as possible especially for the oil charge and the oil container, designs have been proposed in which there is only one wound column with no magnetic ground return. A high degree of success is thereby attained, but at the same time there results an extraordinarily great magnetizing current. The apparent power received on the primary side when running without load is several times as high as the secondary power to be delivered by the voltage transformer. Measuring accuracy is thereby reduced to a great extent; particularly, great angular faults arise.

The present invention concerns a voltage transformer with grounded zero, in which the iron core consists of a single column without magnetic ground return, and which enables one to avoid the above-mentioned drawbacks and to attain nevertheless high degrees of measuring accuracies. The invention consists in that at least part of the necessary magnetizing apparent power is supplied by means of an induced winding, which is effected by means of capacitors connected to said winding.

Figure 1:
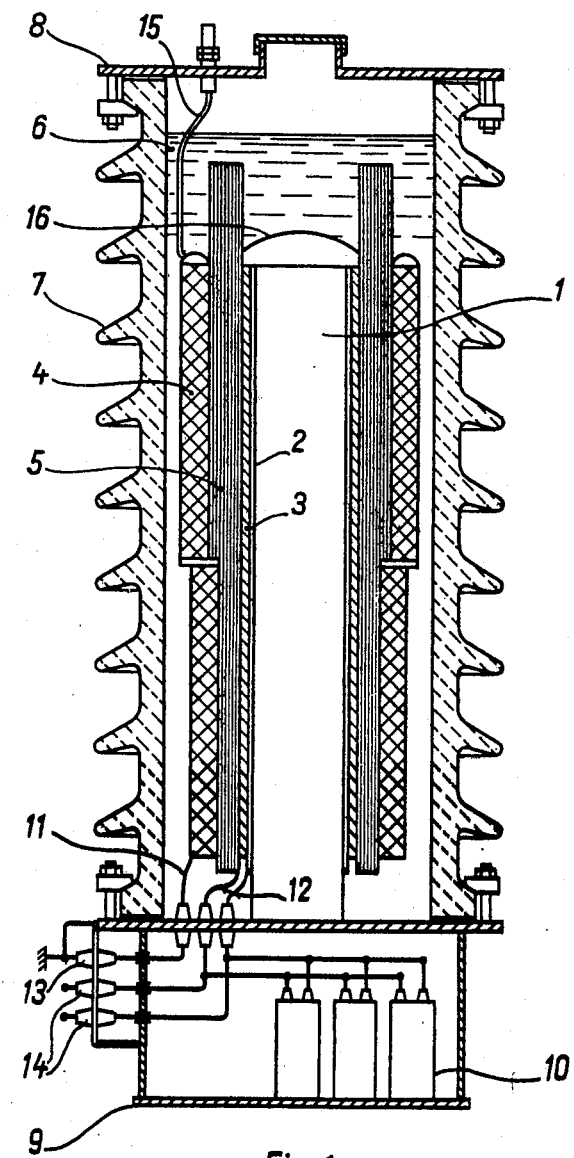
Figure 2:
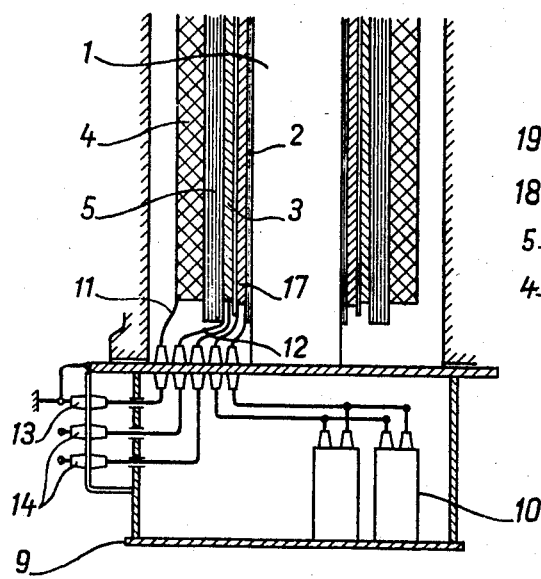
Figure 3:
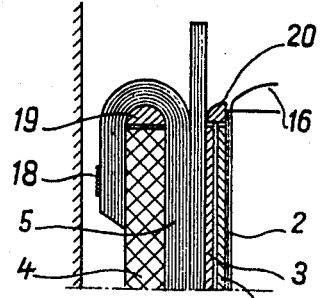
Figure 4:
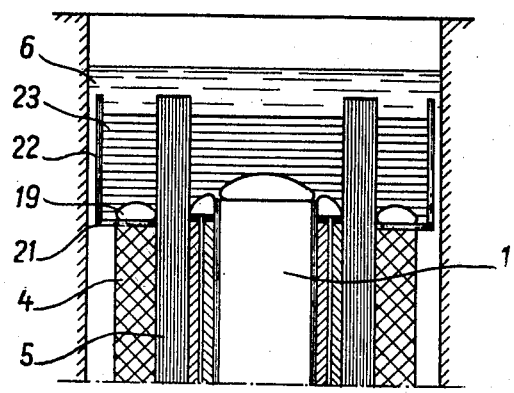

Fig. 1 of the annexed drawing shows diagrammatically and in section an example of embodiment of the present invention. Figs. 2–4 show variants. As shown in Fig. 1, 1 is the stump core without magnetic ground return. An insulating cylinder 2 is slid on it. On the latter is arranged the secondary winding 3 preferably consisting of two layers. Between the primary winding 4 and the secondary winding 3 the cylindrical principal insulation 5 is inserted. The latter bears, at least in the upper part where a high difference of potential exists, as closely as possible and with the avoidance of intervening oil spaces both against the primary and the secondary winding. The principal insulation 5 is wound advantageously out of an absorptive insulating material, paper for example, and later saturated with the insulating liquid of the voltage transformer. The active transformer part thus formed is inserted in a housing 7 made of insulating material and filled with an insulating liquid 6. Said housing is closed on the top by a cover 8 and is set below oiltight on a metal box 9. In the latter are located capacitors 10 connected to the secondary winding 3. It is expedient to lead the primary connection 11 on the ground side and the secondary shunt conductors 12 first into the metal box 9 and then from there to their terminals 13 or 14. The shunt 15 on the potential side is fastened to the cover 8.

The secondary winding 3 must as a rule be provided for a potential of 100 or 110 v. For connecting the capacitors, however, a potential of at least 500 v. would be much more economical. Therefore the capacitors 10 could be connected to the secondary winding 3 by interpolating a transformer of for example 100/500 v. It is however much more simple to apply to the iron core 1 a separate tertiary winding, which serves only to feed the capacitors 10 and is given a voltage that is economical for the latter. In this manner an arrangement is made as shown for example in Fig. 2, where 17 is the tertiary winding.

For certain cases it is advisable to put the capacitors in a place that can be closed, the closure being sealable.

The main insulation 5 (Fig. 1) projects above the windings so as to create a sufficient insulating distance between the end of the potential side of the primary winding and the iron core 1. It is moreover recommended to impart to the iron core on this side a rounded shape. This may be done by placing a cap 16 of insulating material coated with a poor electric conductor on the core.

The danger of a flashover may also be diminished to a great extent by making the principal insulation 5 out of wound paper and forming afterwards in the conventional manner, by tearing open at least part of the individual paper layers, an edging at the end of the high-tension side, as shown for example in Fig. 3 for the end of the winding on the potential side. The edged part is fixed in its position by means of a bandage 18. In the same way at least part of the paper layers may be edged toward the interior, an insulating flange being thus formed both over the induced winding and the iron core. To produce a favorable electric field pattern, shielding rings 19 and 20 are placed on the windings.

Another possible way to obtain sufficient safety against flashover at the winding end of the potential side is shown in Fig. 4, which shows under the shielding ring 19 a ring 21 serving to carry an insulating cylinder 22. The tray formed in this manner is lined with casting resin 23. Places at which the electric fields could easily become too great for insulating oil are in this manner filled with a solid insulating material having sufficient electric strength.

Having thus explained my invention I claim:

1. A high-tension voltage transformer comprising the combination of a base consisting of a metal box, a single upright column iron core on said base, an insulating cylinder fitting around said core, a secondary winding mounted on said cylinder, cylindrical insulation fitting around said winding, a primary winding mounted on said insulation, an upright housing composed of insulating material mounted on said base in spaced relation to said primary winding, insulated liquid filling said housing to a level above the top of said windings, a cover closing the top of said housing, a shunt connecting the potential side of said primary winding to said cover, capacitors located in said box, shunt conductors extending through sealed openings in the top of said box and connecting the terminals of said secondary winding to the terminals of said capacitors, and a conductor connecting the ground side of said primary winding to said base.

2. A high-tension voltage transformer comprising the combination of a base consisting of a metal box, a single upright column iron core on said base, an insulating cylinder fitting around said core, a secondary winding mounted on said cylinder, cylindrical insulation fitting around said winding, a primary winding mounted on said insulation, an upright housing composed of insulating material mounted on said base in spaced relation to said primary winding, insulated liquid filling said housing to a level above the top of said windings, a cover closing the top of said housing, a shunt connecting the potential side of said primary winding to said cover, capacitors located in said box, and means coupling the terminals of said secondary winding and said capacitors including conductors extending through sealed openings in the top of said box.

3. A high-tension voltage transformer comprising the combination of a base consisting of a metal box, a single upright column iron core on said base, an insulating cylinder fitting around said core, a secondary winding mounted on said cylinder, cylindrical insulation fitting around said winding, a primary winding mounted on said insulation, an upright housing composed of insulating material mounted on said base in spaced relation to said primary winding, insulated liquid filling said housing to a level above the top of said windings, a cover closing the top of said housing, a shunt connecting the potential side of said primary winding to said cover, capacitors located in said box, a tertiary winding disposed between and insulated from said secondary winding and said core, and means connecting the terminals of said tertiary winding and those of said capacitors, whereby said primary winding is relieved of extraordinarily high and disturbing magnetizing current.

4. A high-tension voltage transformer as defined by claim 3 in which the cylindrical insulation projects above the primary and secondary windings.

5. A high-tension voltage transformer as defined by claim 4 in which a rounded cap of insulating material coated with a poor electrical conductor is mounted on the core.

6. A high-tension voltage transformer as defined by claim 5 in which shielding rings are disposed on the tops of the windings.

7. A high-tension voltage transformer as defined by claim 6 in which the parts above the windings are cast in solid insulating material.

HANS SCHNEIDER.

References Cited in the file of this patent
UNITED STATES PATENTS

| Number | Name | Date |
|---|---|---|
| 1,462,572 | Gravell | July 24, 1923 |
| 1,992,814 | Cooney | Feb. 16, 1935 |
| 2,097,327 | Hunter | Oct. 26, 1937 |
| 2,116,404 | Montsinger | May 3, 1938 |
| 2,364,881 | Tyrner | Dec. 12, 1944 |